Patented May 27, 1947

2,421,107

UNITED STATES PATENT OFFICE 2,421,107

PROCESS FOR THICKENING LATEX

Clarence Walter Wilson, Norco, Calif., assignor to California Fruit Growers Exchange, Los Angeles, Calif., a corporation of California No Drawing. Application December 2, 1942, Serial No. 467,664

3 Claims. (Cl. 260—815)

This invention relates to the processing of rubber latex for the purpose of preparing it in a condition better for certain uses, particularly those which involve application in fluid or in semi-fluid, semi-solid, or paste form, such as form dipping, to mention a use in which fluid or semi-fluid preparations are commonly employed, and extrusion of soft sealing gaskets, to mention a use for which semi-solid, paste-like preparations are valuable.

The present invention involves a special mode of increasing the viscosity of latex by the use of certain substances which constitute a particular class in the larger group which may be broadly termed "pectous substances." This increase of viscosity may be referred to as thickening.

The term "thickening" as applied to latex may be given various meanings. For example, I use this term with reference to latex in my U. S. Patent Re. 21,077, and I disclose therein the use of certain pectous substances belonging to the particular class of substances which I now propose to employ in the special mode of thickening disclosed for the first time hereinbelow. In that patent I refer to the "thickening" of latex, whether by increasing the concentration of rubber solids in a portion only of the latex by creaming, or by increasing the viscosity of the whole body of the latex by dissolving in it the highly viscous substances therein described and claimed; but the special mode of thickening employed herein is not therein disclosed.

The broad group of pectous substances, while not limited to, would include substances commonly designated as pectin and pectic acid. The salt forms of the latter would be called pectates. These substances, according to commonly accepted present-day views, are composed of anhydro-galacturonic acid units linked together through oxygen bridges into long-chain molecules. The carboxyl groups are thought not to be directly involved in this linkage, but they may occur either in the acid form or as esterified with methyl alcohol, i. e., methoxylated form. Pectin is a methoxylated substance and, following this theoretical structure, a completely methoxylated form would contain approximately 16.3% —OCH$_3$. According to one view, hydrolysis resulting simply in complete demethoxylation would produce a substance which can be designated as "pectic acid," while the intermediate substances of partial demethoxylation can be appropriately termed "pectinic acids." I do not fully share this view.

In my opinion, hydrolysis, particularly alkaline hydrolysis that results in substances which with soluble calcium ions are capable of forming gelatinous precipitates, is not merely demethoxylation but in addition brings about some kind of an intra-molecular shift or re-arrangement of structure and need not necessarily cause complete demethoxylation in order to produce substances that may properly be designated as "pectic acid" and "pectates." Indeed, some workers even contend that completely demethoxylated pectic acids and pectates have not been produced.

The gelatinous precipitates referred to in the above paragraph and formed with, for example, soluble calcium salts, will be coextensive with the whole body of the aqueous medium, or not, depending in part upon the concentrations of materials employed and in part upon the manner in which the precipitations are induced. It will be obvious, as the description of my invention proceeds, that I prefer to form the precipitates substantially coextensive with the whole aqueous body.

My invention, then, briefly stated, comprises increasing the viscosity of latex by forming therein as gelatinous precipitates pectates, i. e., salts of pectic acid, and accordingly it is an object of my invention to provide and disclose new and improved methods and means for thickening rubber latex by means of pectous substances. Other objects, uses, improvements, and advantages will appear more fully and at large hereinafter and in the appended claims.

While my present invention does not exclude the use of the new pectates described and claimed in my U. S. Patent Re. 21,077, it is by no means limited thereto, and it does not depend for its efficacy upon the viscosity per se in aqueous solution of the particular pectic substance introduced into the latex, but rather upon the ability of the pectate, whether completely demethoxylated or not, and whether or not possessing a high intrinsic viscosity in aqueous solution, to form gelatinous precipitates in the latex body. Those new pectates of my above patent may be capable in equal proportions of forming more rigid gels than other pectates previously known and thus would be chosen where a heavy, paste-like preparation is wanted, while a pectate characterized by producing a more nearly fluid, relatively weak gel might be desired for preparing a thickened latex to be used in the deposition of, for example, a more delicate rubber layer.

In general, my process comprises employing the pectate first in a water-soluble form, say, sodium pectate. This is added to the latex, preferably as an aqueous solution. I then incorporate in the latex a suitable source of a metallic ion that will react with the pectate and thus cause it to be precipitated in a gelatinous form. A true gel will not be desired ordinarily, and particularly not one of relatively great strength. In other words, a gel sufficiently strong that it would rupture and break up so as to become lumpy or grainy usually will not be suitable. On the contrary, I customarily prefer a gelatinous precipitate or gel of thixotropic nature, one which will be nearly fluid, or fairly stiff, as the case may be, but which upon positive agitation will become definitely and homogeneously fluid, even though viscous, and will flow smoothly and uniformly, only to return to the gel state when agitation ceases.

One way of carrying out my system of latex thickening is as follows:

Sodium pectate (high viscosity type made by a method shown in my U. S. Patent Re. 21,077) is dissolved in water to make a 1% by weight solution and the solution is added to the latex to be thickened; one part by weight of the solution being added to 4 parts of the latex.

To the mixture is then added, preferably with rapid stirring, a solution of calcium chloride of about 0.8% strength, the solution being added to the latex mixture in about the proportion of three parts of solution for each 100 parts of mixture.

This makes, by way of example:

| | Parts |
|---|---|
| Latex to be creamed | 80 |
| Pectate sol (1%) | 20 |
| Calcium chloride (0.8%) | 3 |

The rapid stirring during the addition of the calcium chloride solution is desirable to prevent local formation of hard gel particles and to give a smooth, continuous, fluid gel.

If, instead of the calcium chloride, finely divided calcium sulfate (with two molecules of water of hydration) be added in an amount of about 3 parts of suspension containing about 1.3% of the calcium sulfate, thickening will be much slower, and the agitation may be much more gentle. The agitation should, however, be kept up until substantially all of the calcium sulfate has had time to dissolve and combine with the pectate.

A further example of the practice of my invention involves the use of a low viscosity pectate of the type disclosed in Huber U. S. Patent 1,410,920.

Manifestly, widely varying proportions of materials may be employed, all as will be obvious to those skilled in the art of handling and utilizing pectous substances once they have become acquainted with the principles upon which my invention rests, which principles are fully disclosed herein. It is not deemed necessary to recite in detail the practical combining values to form gelatinous precipitates of the various partially and substantially completely demethoxylated pectous substances possessing the characteristics of "pectates" as set forth herein, and neither is it deemed necessary to relate thereto in detail the combining values of the various alkaline earth and heavy metal ions capable of causing the desired gelation. All that is deemed necessary to disclose is that such substances will ordinarily be used in substantially their known practical combining proportions to form a gel of the character described.

Some of the uses to which latex is now put, and particularly to which it may be put when thickened in accordance with my present invention, have previously been served by so-called rubber solutions. However, the substitution of latex for such solutions has long been desired, for these rubber solutions had numerous disadvantages in their industrial applications. Certain of these disadvantages were the unavoidably high viscosity of a solution of comparatively low rubber content; the fire and health hazards inherent in the types of solvent which were necessarily used; and the expenses occasioned by the handling and inevitable losses of volatile organic liquids. As against these disadvantages, latex, being an emulsion, may be obtained in vastly higher rubber solids concentration for a given viscosity, or conversely, an equal amount of rubber solids may be employed in a liquid of considerably less viscosity than a solution containing approximately the same rubber solids. Furthermore, water is substantially the cheapest vehicle known to industry, and no hazards are presented in its use. When it is desired to use a latex which has been thickened so that its viscosity approaches that of a solution of similar rubber content, there still remain advantages in favor of the latex, for example, the lack of stringiness and greater economy.

Latex as obtained from the plantation generally has a rubber content of from about 32% to 36% and for certain uses must be concentrated. That is, a certain portion of the serum must be removed from the latex, giving a concentrated latex containing a greater percentage of rubber. Latex is often so concentrated for purpose of shipment from the plantation to the place where it is to be used. In many uses, however, the actual rubber content of latex need not be high but the physical characteristics of the latex must for practical reasons correspond to those of a thick, viscous solution, or even a more or less solid paste. In these uses the latex still retains the hygienic, safety, and solvent cost advantages over rubber solutions of similar properties. Increase in viscosity may be obtained by thickening the latex without at the same time increasing the rubber concentration.

One example of the use of latex is in the common dipping method wherein forms of different materials and of various and perhaps complicated shapes are introduced into a latex solution and subsequently withdrawn, retaining an adherent coating of latex in greater or less thickness. For most articles so produced it is quite undesirable for the latex to run down the form, or to drip from the form unduly after it is withdrawn from the solution. Running down the form produces a coating of variable thickness. Clearly, thin watery latex will tend to give more trouble of this kind than will more viscous solutions. And yet a latex of not too high rubber content may be required, so that too thick a layer of rubber shall not be deposited upon the form. Also, it is undesirable to use a latex composition which has been thickened with large amounts of viscous substances which would, therefore, produce a film having a substantial minor proportion of rubber compared to the thickening substances. When pectic substances are used as herein disclosed, this undesirable condition is avoided.

By thickening latex with pectate according to my present process I am able to give to the latex a thixotropic character, as above pointed out, and this greatly enhances its value for such uses as the above.

Other processes wherein thickened latices are useful are those involving waterproofing fabrics, producing sheet rubber by the employment of rolls dipping into latex solutions, and extrusion of semi-solid rubber gaskets, as for example, for can sealing.

Heretofore, numerous processes for thickening latex have been suggested. The known thickeners include such substances as heavy metal salts, polysaccharides, albuminoids, colloidal clays, casein, glue, soluble silicates, et cetera.

The thickness, viscosity, total solids content, and other properties of the product may be varied by numerous changes in the proportions which I have specifically disclosed herein as exemplary of my invention. The quantity of pectates used to thicken a latex of a given solids content may be varied within a wide range. In certain cases it will be useful to employ the pectate in sufficient quantity to cause actual gelation of the latex. My process may be applied to substantially all of the numerous types of latex used in industry, according to the particular purpose for which the product is intended.

While, in the specific examples given above, only two calcium salts have been mentioned, it is to be understood that the particular salts mentioned in the examples are not specific to the particular uses illustrated, and, moreover, it is to be noted that any water soluble calcium salt will be found to be suitable for thickening latex. I have successfully used calcium sulfate, and I intend to include in my disclosure salts of substantially equal or greater solubility in water. Furthermore, other water soluble alkaline earth salts (strontium, barium) may be used, as may be water soluble salts of most of the heavy metals. Though not ruled out by failure to thicken latex, salts of metals which adversely affect the properties of rubber (e. g., copper) will obviously not ordinarily be used.

The soluble pectates will ordinarily be the alkali metal, ammonium, or organic base salts of the completely or partially demethoxylated pectic acids, whether obtained by the methods described in my Patent Re. 21,077, or by other methods, for example, that described by Huber in U. S. Patent 1,410,920, or by other known methods. It will be obvious from what has been said above that by the term "soluble pectates" herein, I mean soluble in water.

In the appended claims I intend the term latex to include natural latex, concentrated latex, synthetic latex, latex cream, vulcanized latex, and emulsions of rubber-like substances.

The subject matter of the present application is related to, but is to be distinguished from the specific aspects of, my co-pending application Serial No. 414,383, filed October 9, 1941, in which the pectous substance is added to the latex in the form of pectin and is converted in situ into a gelatinous precipitate or gel which, in its best form, has a thixotropic nature. I find that by employing the pectous substance in a form already definitely hydrolyzed to a material which, whether fully demethoxylated or not, I term "pectate" herein (or "pectic acid" if in the free or uncombined form), I am able to control with greater precision the nature and extent of the actual final hydrolysed state of the pectous material in the thickened latex, and this I consider as an important aid in controlling with delicacy the ultimate result.

Having thus described my invention in such full, clear, and exact language as to enable others skilled in this art to make use of the same, I claim:

1. A process for converting fluid latex to a thixotropic gel which comprises dissolving in the latex a soluble alkali pectate, dispersing in the latex a calcium salt having a solubility in water at least substantially equal to that of calcium sulfate, and forming in the latex by interaction of the pectate and the calcium salt a gelatinous precipitate constituting a thixotropic gel coextensive with the body of the latex.

2. A process for converting fluid latex to a thixotropic gel which includes dissolving in the latex a soluble pectate, dispersing in the latex an alkaline earth salt having a solubility in water at least substantially equal to that of calcium sulfate, and forming in the latex by interaction of the pectate and the alkaline earth salt a gelatinous precipitate constituting a thixotropic gel coextensive with the body of the latex.

3. A process for converting fluid latex to a thixotropic gel which comprises dissolving in the latex a soluble sodium pectate, dispersing in the latex a calcium salt having a solubility in water at least substantially equal to that of calcium sulfate, and forming in the latex by interaction of the pectate and the calcium salt a gelatinous precipitate constituting a thixotropic gel coextensive with the body of the latex.

CLARENCE WALTER WILSON.

REFERENCES CITED

The following references are of record in the file of this patent:

UNITED STATES PATENTS

| Number | Name | Date |
|---|---|---|
| Re. 21,077 | Wilson | May 9, 1939 |
| 1,647,805 | McGavach | Nov. 1, 1927 |
| 2,041,712 | Hiers | May 26, 1936 |
| 2,065,937 | Hiers | Dec. 29, 1936 |
| 2,132,064 | Wilson | Oct. 4, 1938 |
| 2,203,866 | Gibbons | June 11, 1940 |

OTHER REFERENCES

Ind. and Eng. Chem. vol. 33 of 1941, page 290.